Patented Aug. 13, 1940

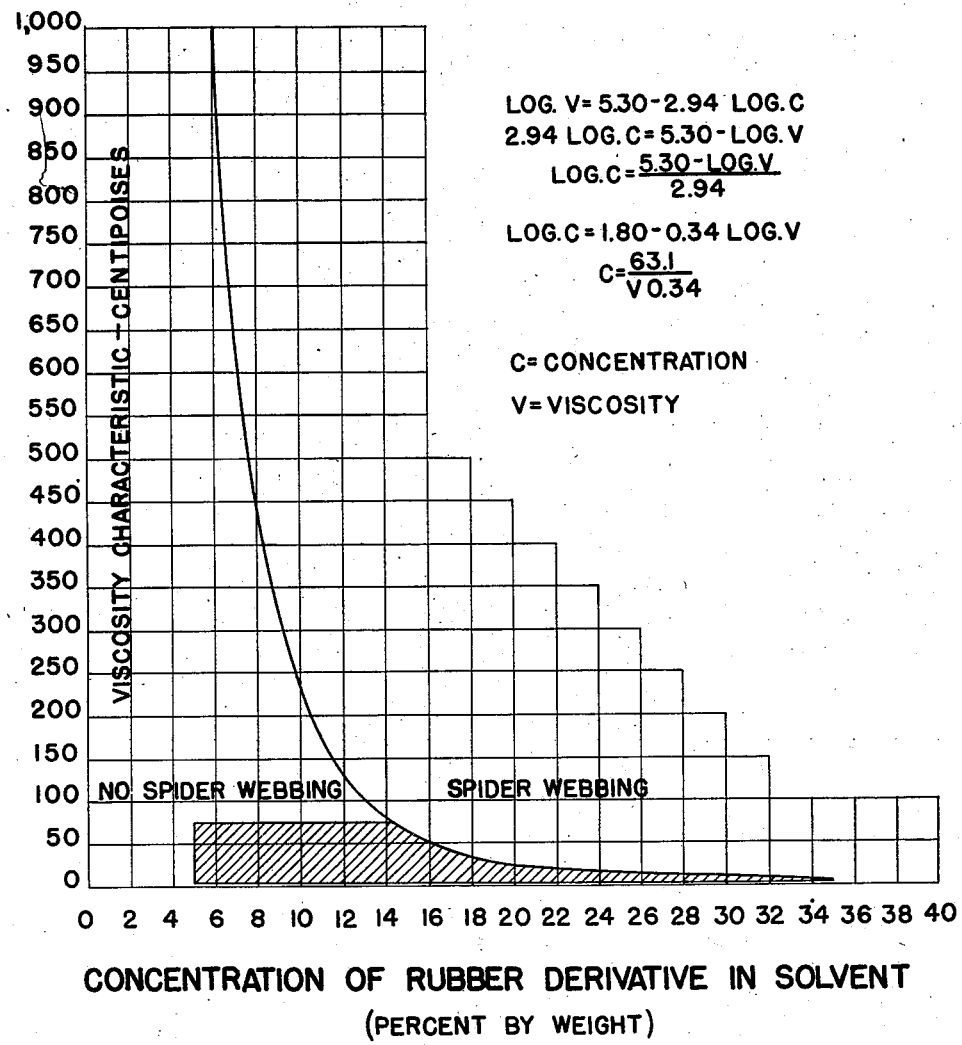

2,211,431

UNITED STATES PATENT OFFICE 2,211,431

LACQUER COMPOSITION CONTAINING A SOLUTION OF CHLORINE-CONTAINING RUBBER

Arloe R. Olsen, Wilmington, Del., assignor to Hercules Powder Company, Wilmington, Del., a corporation of Delaware Application October 12, 1938, Serial No. 234,558

12 Claims. (Cl. 260—735)

This invention relates to a lacquer composition containing a solution of chlorine-containing rubber, and more specifically to a lacquer comprising a solution of chlorine-containing rubber which can be sprayed by the usual spray gun without "spider-webbing."

Chlorine-containing rubber may be prepared, for example, according to the process described in United States Patent No. 1,234,381, issued July 24, 1917.

Heretofore, it has been possible to prepare various solutions of chlorine-containing rubber, such as chlorinated rubber or chlorinated rubber hydrochloride, in a solvent therefor, preferably with the addition of plasticizer, resin, pigment, etc., for application to a surface by brushing, but such compositions have been inapplicable by spraying with the usual spray gun without great dilution by further addition of solvent, for the reason that, when used in a spray gun, they caused a "spider-webbing" effect, or extension from the spray nozzle of the spray gun of long threads of semi-dry composition.

While it is true, that many chlorine-containing rubber compositions heretofore described may be sprayed after a fashion, the above defects have rendered such compositions impractical to use. Repeated, but unsuccessful, attempts have been made to overcome this difficulty. Since spraying by spray gun is the most effective method of application of a lacquer, such chlorine-containing rubber lacquers have suffered a serious disadvantage, in spite of their general, outstanding advantages of superior resistance to alkaline and acid conditions.

I have found that spider-webbing of lacquers, containing chlorine-containing rubber, for example, chlorinated rubber, rubber hydrochloride, chlorinated rubber hydrochloride or mixtures thereof, can be prevented by a suitable combination of viscosity characteristic of the chlorine-containing rubber, together with suitable concentrations thereof in the solvent therefor, and suitable evaporation rates of said solvents for the chlorine-containing rubber.

Such choice of combinations is not at all comparable to the use of nitrocellulose of low viscosity characteristic in nitrocellulose lacquers, for the reason that the nitrocellulose of low viscosity characteristic is used to increase the total solids content of the lacquer, and not to effect the sprayability. Practically any concentration of nitrocellulose that will flow readily, can be sprayed, but such is not the case with chlorine-containing rubber lacquers.

Viscosity characteristic, as used in this specification is hereby defined to mean the viscosity in centipoises of a 20% by weight solution of chlorine-containing rubber in toluene, as determined by a capillary type viscosimeter at 25° C.

It will be readily appreciated that viscosity of a solution is wholly different from viscosity characteristic of a solid substance, e. g., nitrocellulose or chlorinated rubber. A solid substance may have a high or a low viscosity characteristic. For example, nitrocellulose may have a viscosity characteristic such that, when dissolved in a given quantity of solvent therefor, it will produce a stiff gel, a viscous solution, or a solution as thin as water. On the other hand, a given nitrocellulose solution may have the solution viscosity reduced by adding to said solution more of the same solvent, without, however, effecting in any way the viscosity characteristic of the nitrocellulose dissolved therein.

I have found that a lacquer containing a chlorine derivative of rubber having a viscosity characteristic between about 5 centipoises and about 75 centipoises, dissolved in a volatile solvent, in concentrations ranging from about 5% to about 35% by weight is a highly satisfactory lacquer. I have found that this lacquer may be sprayed without spider-webbing, provided that the concentration for any given viscosity characteristic of said chlorine derivative of rubber in the solvent is beneath the curve shown on the accompanying drawing.

The choice of a solvent or solvent combination depends on a great many factors, one of the most important of which is the proper selection of the evaporation rate thereof. The evaporation rate must be neither too fast nor too slow because a solvent composition which evaporates too fast results in a very poor finish while one which evaporates too slowly, nullifies one of the major advantages gained by using lacquers. It will, therefore, be understood that where in the specification and claims I refer to a volatile solvent, I mean a solvent or solvent combination chosen in a manner so as to produce on the surface to be sprayed a smooth wet layer of the composition which dries to a smooth, uniform coating. Among the volatile solvents which I have used and found very satisfactory in formulating compositions in accordance with my invention are toluene, hy-flash, naphtha, xylene or various combinations of these but it will be appreciated that other solvents or solvent combinations may also be used.

Referring now to the accompanying drawing, the ordinates represent various viscosity characteristics of chlorine-containing rubber, expressed in centipoises, determined as hereinbefore described, and the abscissae represent concentrations of chlorine-containing rubber, the solvent consisting of a volatile solvent as hereinbefore described. Areas below the curve shown in the drawing will be found to represent chlorine-containing rubber solutions which will not spider-web on spraying, while areas above said curve will be found to spider-web on spraying.

In the accompanying drawing where V represents viscosity characteristic in centipoises of the chlorine-containing rubber, and C represents the concentration thereof in said solvent, it will be found that the curve has the shape represented by the equation log V=5.30—2.94 log C, or 2.94 log C=5.30—log V, or $$\log C = \frac{5.30 - \log V}{2.94}$$

or log C=1.80—0.34 log V, which may be further simplified to $$C = \frac{63.1}{V^{0.34}}$$

Thus it is evident that, where V represents viscosity characteristic in centipoises of the chlorine-containing rubber, and C represents the concentration thereof in a volatile solvent, all the compositions represented by the area beneath the line defined by the equation $$C = \frac{63.1}{V^{0.34}}$$

will be compositions which will spray without spider-webbing.

While all the compositions shown below the curve in the attached drawing may be sprayed without spider-webbing, not all of the compositions there represented will be found generally useful as lacquers. A chlorine derivative of rubber having a viscosity characteristic higher than 75 centipoises affects the viscosity of the resultant lacquer solution to too great an extent and, therefore, requires dilution which results in a creases in the non-volatile content which can be applied per coat. A concentration of chlorine derivative of rubber in the lacquer of less than about 5% by weight contains an insufficient amount of said derivative to produce the highly desirable properties given to such compositions by the use of larger amounts of this derivative. In other words, the outstanding advantage of chlorine-containing rubber lacquers, such as excellent resistance to acid, alkaline and other chemical conditions is lost. Concentrations of chlorine-containing rubber derivative in excess of those shown by the curve are, of course, inoperable because of spider-webbing.

The range of compositions to which my invention is particularly directed and which I have found most generally useful, are those falling within the area shown by the cross hatching in the accompanying drawing. In accordance with my invention a chlorine-containing rubber lacquer which can be sprayed without spider-webbing will comprise a chlorine-containing rubber having a viscosity characteristic within the range from about 5 centipoises to about 75 centipoises, in solution in a volatile solvent therefor, the concentration of chlorine-containing rubber therein varying within the range from about 35% to about 5% by weight, and the concentration for any given viscosity characteristic of said chlorine derivative of rubber being not in excess of that defined by the equation $$C=\frac{63.1}{V^{0.34}}$$

where V and C have the meaning hereinbefore given.

In lacquers where a very high non-volatile content is desirable and also a high content of chlorine-containing rubber derivative, I have found that those compositions under the curve between the viscosity range of about 5 to 75 centipoises, and a concentration of about 14.5 to about 35% by weight are particularly effective.

As more specific embodiments of compositions embodying my invention, I give by way of example, the following:

Chlorinated rubber (viscosity characteristic 6 c. p.), 33% by weight; toluene, 67% by weight; chlorinated rubber (viscosity characteristic 6 c. p.), 17% by weight; toluene, 83% by weight; chlorinated rubber (viscosity characteristic 57 c. p.), 15% by weight; toluene, 85% by weight; chlorinated rubber (viscosity characteristic 6 c. p.), 34% by weight; xylene 66% by weight; chlorinated rubber (viscosity characteristic 6 c. p.), 20% by weight; xylene, 80% by weight; chlorinated rubber (viscosity characteristic 67 c. p.), 16% by weight; xylene, 85% by weight; chlorinated rubber (viscosity characteristic 6 c. p.), 33% by weight; solvent naphtha, 67% by weight; chlorinated rubber (viscosity characteristic 6 c. p.), 21% by weight; solvent naphtha, 79% by weight; chlorinated rubber (viscosity characteristic 63 c. p.), 17% by weight; solvent naphtha, 83% by weight; chlorinated rubber hydrochloride, 46.8% chlorine-content (viscosity characteristic 41 c. p.), 19% by weight; xylene, 81% by weight.

I may also add pigments, resins, plasticizers, etc., to any of the above compositions and I may do this in almost endless variety. By way of example such a composition within the scope of my invention is as follows:

| | Parts by weight |
|---|---|
| Chlorinated rubber (viscosity characteristic—25 centipoises) | 20 |
| Dibutyl phthalate | 5 |
| Oil modified alkyd resin (Rezyl 1103) | 1.5 |
| Chrome green | 6 |
| Xylol | 75 |

It will be understood that wherein the specification and claims I refer to a chlorine-containing rubber lacquer, I mean a lacquer which contains a chlorine derivative of rubber such as chlorinated rubber, rubber hydrochloride, chlorinated rubber hydrochloride or mixtures thereof.

It will also be understood that the examples hereinbefore set forth are illustrative only and that the scope of my invention is not limited thereto, except as hereinafter provided by the claims.

This application is a continuation-in-part of my application, Serial No. 132,132, filed by me on March 20, 1937, which in turn was a continuation-in-part of my application, Serial No. 32,882, filed by me on July 24, 1935.

What I claim and desire to protect by Letters Patent is:

1. A chlorine-containing rubber lacquer capable of being sprayed without spider-webbing, which comprises a chlorine-containing rubber derivative having a viscosity characteristic within the range from about 5 to about 75 centipoises in solution in a volatile solvent therefor said solvent having an evaporation rate between that of toluene and hi-flash naphtha, the concentration of said chlorine derivative of rubber therein varying within the range from about 35% to about 5% by weight, the per cent by weight concentration for any given viscosity characteristic of said chlorine derivative of rubber being not in excess of that defined by the equation $$C = \frac{63.1}{V^{0.34}}$$

where V represents the viscosity characteristic in centipoises of the chlorine derivative of rubber and C represents the per cent by weight concentration of said chlorine derivative of rubber in said solvent.

2. A chlorine-containing rubber lacquer capable of being sprayed without spider-webbing, which comprises a chlorine derivative of rubber having a viscosity characteristic within the range from about 5 to about 75 centipoises in solution in toluene, the concentration of said chlorine derivative of rubber therein varying within the range from about 35% to about 5% by weight, the per cent by weight concentration for any given viscosity characteristic of said chlorine derivative of rubber being not in excess of that defined by the equation $$C = \frac{63.1}{V^{0.34}}$$

where V represents the viscosity characteristic in centipoises of the chlorine derivative of rubber and C represents the per cent by weight concentration of said chlorine derivative of rubber in said solvent.

3. A chlorine-containing rubber lacquer capable of being sprayed without spider-webbing, which comprises a pigment and a chlorine derivative of rubber having a viscosity characteristic from about 5 to about 75 centipoises in solution in a volatile solvent therefor said solvent having an evaporation rate between that of toluene and hi-flash naphtha, the concentration of said chlorine derivative of rubber therein varying within the range of 35% to about 5% by weight, the per cent by weight concentration for any given viscosity characteristic of said chlorine derivative of rubber being not in excess of that defined by the equation $$C = \frac{63.1}{V^{0.34}}$$

where V represents the viscosity characteristic in centipoises of the chlorine derivative of rubber and C represents the per cent by weight concentration of said chlorine derivative in said solvent.

4. A chlorinated rubber lacquer capable of being sprayed without spider-webbing, which comprises chlorinated rubber having a viscosity characteristic within the range from about 5 to about 75 centipoises in solution in a volatile solvent therefor said solvent having an evaporation rate between that of toluene and hi-flash naphtha, the concentration of said chlorinated rubber therein varying within the range from about 35% to about 5% by weight, the per cent by weight concentration for any given viscosity characteristic of said chlorinated rubber being not in excess of that defined by the equation $$C = \frac{63.1}{V^{0.34}}$$

where V represents the viscosity characteristic in centipoises of the chlorinated rubber and C represents the per cent by weight concentration of said chlorinated rubber in said solvent.

5. A chlorinated rubber lacquer capable of being sprayed without spider-webbing, which comprises chlorinated rubber having a viscosity characteristic within the range from about 5 to about 75 centipoises in solution in a volatile solvent therefor said solvent having an evaporation rate between that of toluene and hi-flash naphtha, the concentration of said chlorinated rubber therein varying within the range from about 35% to about 14.5% by weight, the per cent by weight concentration for any given viscosity characteristic of said chlorinated rubber being not in excess of that defined by the equation $$C = \frac{63.1}{V^{0.34}}$$

where V represents the viscosity characteristic in centipoises of the chlorinated rubber and C represents the per cent by weight concentration of said chlorinated rubber in said solvent.

6. A chlorine-containing rubber lacquer capable of being sprayed without spider-webbing, which comprises a chlorine derivative of rubber having a viscosity characteristic within the range from about 5 to about 75 centipoises in solution in hi-flash naphtha, the concentration of said chlorine derivative of rubber therein varying within the range from about 35% to about 5% by weight, the per cent by weight concentration for any given viscosity characteristic of said chlorine derivative of rubber being not in excess of that defined by the equation $$C = \frac{63.1}{V^{0.34}}$$

where V represents the viscosity characteristic in centipoises of the chlorine derivative of rubber and C represents the per cent by weight concentration of said chlorine derivative of rubber in said hi-flash naphtha.

7. A chlorine-containing rubber lacquer capable of being sprayed without spider-webbing, which comprises a chlorine derivative of rubber having a viscosity characteristic within the range from about 5 to about 75 centipoises in solution in xylene, the concentration of said chlorine derivative of rubber therein varying within the range from about 35% to about 5% by weight, the per cent by weight concentration for any given viscosity characteristic of said chlorine derivative of rubber being not in excess of that defined by the equation $$C = \frac{63.1}{V^{0.34}}$$

where V represents the viscosity characteristic in centipoises of the chlorine derivative of rubber and C represents the per cent by weight concentration of said chlorine derivative of rubber in said xylene.

8. A chlorinated rubber lacquer capable of being sprayed without spider-webbing, which comprises chlorinated rubber having a viscosity characteristic within the range from about 5 to about 75 centipoises in solution in toluene, the concentration of said chlorinated rubber therein varying within the range from about 35% to about 5% by weight, the per cent by weight concentration for any given viscosity characteristic of said chlorinated rubber being not in excess of that defined by the equation $$C = \frac{63.1}{V^{0.34}}$$

where V represents the viscosity characteristic in centipoises of the chlorinated rubber and C represents the per cent by weight concentration of said chlorinated rubber in said toluene.

9. A chlorinated rubber lacquer capable of being sprayed without spider-webbing, which comprises chlorinated rubber having a viscosity characteristic within the range from about 5 to about 75 centipoises in solution in hi-flash naphtha, the concentration of said chlorinated rubber therein varying within the range from about 35% to about 5% by weight, the per cent by weight concentration for any given viscosity characteristic of said chlorinated rubber being not in excess of that defined by the equation $$C = \frac{63.1}{V^{0.34}}$$

where V represents the viscosity characteristic in centipoises of the chlorinated rubber and C represents the per cent by weight concentration of said chlorinated rubber in said hi-flash naphtha.

10. A rubber hydrochloride lacquer capable of being sprayed without spider-webbing, which comprises rubber hydrochloride having a viscosity characteristic within the range from about 5 to about 75 centipoises in solution in a volatile solvent therefor, said solvent having an evaporation rate between that of toluene and hi-flash naphtha, the concentration of said rubber hydrochloride therein varying within the range from about 35% to about 5% by weight, the per cent by weight concentration for any given viscosity characteristic of said rubber hydrochloride being not in excess of that defined by the equation $$C = \frac{63.1}{V^{0.34}}$$

where V represents the viscosity characteristic in centipoises of the rubber hydrochloride and C represents the per cent by weight concentration of said rubber hydrochloride in said solvent.

11. A chlorinated rubber hydrochloride lacquer capable of being sprayed without spider-webbing, which comprises chlorinated rubber hydrochloride having a viscosity characteristic within the range from about 5 to about 75 centipoises in solution in a volatile solvent therefor, said solvent having an evaporation rate between that of toluene and hi-flash naphtha, the concentration of said chlorinated rubber hydrochloride therein varying within the range from about 35% to about 5% by weight, the per cent by weight concentration for any given viscosity characteristic of said chlorinated rubber hydrochloride being not in excess of that defined by the equation $$C = \frac{63.1}{V^{0.34}}$$

where V represents the viscosity characteristic in centipoises of the chlorinated rubber hydrochloride and C represents the per cent by weight concentration of said chlorinated rubber hydrochloride in said solvent.

12. A chlorinated rubber hydrochloride laquer capable of being sprayed without spider-webbing, which comprises chlorinated rubber hydrochloride having a viscosity characteristic within the range from about 5 to about 75 centipoises in solution in xylene, the concentration of said chlorinated rubber hydrochloride therein varying within the range from about 35% to about 5% by weight, the per cent by weight concentration for any given viscosity characteristic of said chlorinated rubber hydrochloride being not in excess of that defined by the equation $$C = \frac{63.1}{V^{0.34}}$$

where V represents the viscosity characteristic in centipoises of the chlorinated rubber hydrochloride and C represents the per cent by weight concentration of said chlorinated rubber hydrochloride in said xylene.

ARLOE R. OLSEN.

CERTIFICATE OF CORRECTION.

Patent No. 2,211,431.  August 13, 1940.

ARLOE R. OLSEN.

It is hereby certified that error appears in the printed specification of the above numbered patent requiring correction as follows: Page 2, first column, line 46, for "creases" read --decrease--; and second column, line 29, for "16%" read --15%--; and that the said Letters Patent should be read with this correction therein that the same may conform to the record of the case in the Patent Office.

Signed and sealed this 1st day of October, A. D. 1940.

(Seal)

Henry Van Arsdale,
Acting Commissioner of Patents.